(12) United States Patent
Buch-Lorentsen et al.

(10) Patent No.: US 11,365,724 B2
(45) Date of Patent: Jun. 21, 2022

(54) WIND TURBINE HAVING A HOLLOW, WALKABLE GENERATOR SHAFT

(71) Applicant: Siemens Gamesa Renewable Energy A/S, Brande (DK)

(72) Inventors: Karsten Buch-Lorentsen, Ry (DK); Leif Christian Rask, Lem St (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 12 days.

(21) Appl. No.: 16/918,011

(22) Filed: Jul. 1, 2020

(65) Prior Publication Data
US 2021/0017964 A1    Jan. 21, 2021

(30) Foreign Application Priority Data

Jul. 18, 2019    (EP) ...................................... 19187016

(51) Int. Cl.
| | |
|---|---|
| *F03D 80/50* | (2016.01) |
| *F03D 9/25* | (2016.01) |
| *F03D 1/06* | (2006.01) |

(52) U.S. Cl.
CPC ........... *F03D 80/50* (2016.05); *F03D 1/0658* (2013.01); *F03D 9/25* (2016.05); *F05B 2240/221* (2013.01); *F05B 2240/61* (2013.01)

(58) Field of Classification Search
CPC .......... F03D 80/50; F03D 9/25; F03D 1/0658; F05B 2240/221; F05B 2240/61
See application file for complete search history.

(56) References Cited

U.S. PATENT DOCUMENTS

| 6,285,090 B1 | 9/2001 | Industrie | |
|---|---|---|---|
| 10,125,543 B2* | 11/2018 | Ebbesen | F03D 80/50 |
| 2012/0263602 A1* | 10/2012 | Booth | F03D 80/50 |
| | | | 416/244 R |
| 2013/0302175 A1* | 11/2013 | Munk-Hansen | F03D 1/0691 |
| | | | 416/245 R |
| 2014/0003943 A1* | 1/2014 | Valero Lafuente | F03D 1/0691 |
| | | | 416/146 R |

(Continued)

FOREIGN PATENT DOCUMENTS

| EP | 1985846 A1 | 10/2008 |
|---|---|---|
| EP | 2837821 A1 | 2/2015 |

OTHER PUBLICATIONS

European Search Report dated Jan. 23, 2020 for Application No. 19187016.1.

*Primary Examiner* — Courtney D Heinle
*Assistant Examiner* — Ryan C Clark
(74) *Attorney, Agent, or Firm* — Schmeiser, Olsen & Watts LLP

(57) ABSTRACT

Wind turbine having a hollow, walkable generator shaft of a generator assembly and a hollow hub attached to the generator shaft and having at least two blades attached to it, wherein the hub is enterable from the generator shaft and the wind turbine is stoppable in at least two predetermined maintenance positions of the blades, wherein the wind turbine further comprises a safety arrangement, in which a rotatably supported safety element having a door is mounted covering the opening leading from the generator shaft into the hub, wherein a locking arrangement for fixing the safety element in an entering position, in which the door is vertically oriented, is provided.

10 Claims, 3 Drawing Sheets

(56) References Cited

U.S. PATENT DOCUMENTS

2014/0050591 A1\* 2/2014 Munk-Hansen ........ F03D 80/50
                                                        416/244 R
2019/0078551 A1\* 3/2019 Chernobilsky ......... F03D 80/50

\* cited by examiner

WIND TURBINE HAVING A HOLLOW, WALKABLE GENERATOR SHAFT

CROSS-REFERENCE TO RELATED APPLICATIONS

This application claims priority to European Application No. 19187016.1, having a filing date of Jul. 18, 2019, the entire contents of which are hereby incorporated by reference.

FIELD OF TECHNOLOGY

The following concerns a wind turbine having a hollow, walkable generator shaft of a generator assembly and a hollow hub attached to the generator shaft and having at least two blades attached to it, wherein the hub is enterable from the generator shaft and the wind turbine is stoppable in at least two predetermined maintenance positions of the blades.

BACKGROUND

Wind turbines, in particular in larger sizes, have become common sources of electrical energy. Often, the wind turbine comprises a tower carrying a nacelle, in which a generator of a generator arrangement of the wind turbine may be located. Rotational energy for the generator is provided by wind-driven blades connected to a rotor hub of the wind turbine, which, in turn, is fixed to a generator shaft of the generator arrangement. Wind turbines with or without a gear box have been proposed.

Increasing focus is laid upon the protection of service personnel working in a wind turbine, in particular, since wind turbines increase in size. Wind turbines of a size where it is possible to enter into the hub from a hollow generator shaft have already been proposed. In this case, the safety of technicians who want to enter into the hub has to be ensured, in particular when passing from the hollow generator shaft into the hollow hub. However, to accommodate different service tasks, several possible, predetermined maintenance positions of the blades (stop positions) have to be defined and used. For example, such predetermined maintenance positions may comprise positions in which a certain blade points vertically downwards, positions in which a certain blade points vertically upwards and/or a position in which a certain blade points horizontal, either to the left or to the right. In a wind turbine having three blades, these definitions provide a total of twelve different maintenance positions of the blades and thus the rotor hub.

Since there is a considerable height difference between the generator shaft and the interior wall of the hub, into which the technician can enter, safety measures to prevent a service technician from unintentionally falling into the hub would be expedient. These measures should also provide a structure allowing safe entrance into the hub. However, a lot of different predetermined maintenance positions can be accommodated, resulting in complex constructional approaches.

SUMMARY

An aspect relates to providing safety measures of an easy construction between the rotor hub and the generator shaft, facilitating safe entrance into the hollow hub.

To achieve this aspect, according to embodiments of the current invention, a wind turbine as initially described comprises a safety arrangement, in which a rotatably supported safety element having a door is mounted covering the opening leading from the generator shaft into the hub, wherein a locking arrangement for fixing the safety element in an entering position, in which the door is vertically oriented, is provided.

It is thus proposed to use a rotatable framework solution at the hub entrance such that, due to the rotatability, the safety element may be turned, if necessary, to fit any of the maintenance positions of the blades and thus the hub. The safety element of the safety arrangement covers the opening into the rotor hub, such that protection for service technicians is provided, in particular preventing them from falling into the hub unintentionally. A doorway is implemented through which safe entrance into the rotor hub can take place. To further increase safety for the service technician, the safety element may be fixed in the entering position, such that unintentional rotation of the safety element, in particular during entering the hub or vice versa, is prevented.

Advantageously, such a safety measure that can be adjusted to fit the actual maintenance position will both save material and space compared to a fixed solution for each maintenance position. Safety for persons working in the wind turbine is advantageously increased.

In embodiments, the safety element may comprise a fence-like structure, in particular a metal structure, in which the door is provided. For example, aluminium or, thin, sheet metal may be used as a material for such a fence-like structure. As is the case with aluminium or an alloy comprising aluminium or thin sheet metal, the safety element may be light-weight. Additionally, using metal as a material provides stability, wherein the fence-like or grid-like arrangement reduces the material requirement substantially and provides a good view into the hub from the generator shaft for the service technician.

The safety element, in particular a frame or outer part of the fence-like structure, is rotatably supported using rollers mounted to the generator shaft and/or the hub. For example, a circular frame or outer part, in particular a metal frame or outer part, may be supported and guided on rollers provided circumferentially around the opening of the hollow generator shaft into the hub. The rollers or wheels may comprise a central indentation into which the frame or outer part engages for guiding and supporting the frame or outer part, allowing movement only in a rotational direction.

In advantageous embodiments, the locking arrangement may comprise a locking lever, in particular engaging the frame. The locking lever may have a handle to facilitate operation by a service technician.

Generally, the locking arrangement may advantageously be in a locked position during normal operation of the wind turbine, that is, with no maintenance works going on. Thus, during normal operation of the wind turbine, the safety element rotates with the generator shaft and the hub, reducing wear on bearing elements supporting the safety element and the safety element itself, for example reducing wear exerted onto rollers. If a service technician wants to enter the rotor hub for maintenance, they unlock the locking arrangement, turn the safety element into the entering position, and re-lock the locking arrangement to fix the safety element in its current orientation corresponding to the entering position. They may now safely use the door to enter and subsequently leave the hub.

The door may comprise a lock controlled by a detection device such that the door only opens when the safety element is in the entering position and/or fixed by the locking arrangement. In this manner, safety may be further increased. For example, the detection device may comprise a gravity sensor for detecting a predefined orientation of the safety element corresponding to the entering position, in particular having the door in a vertical position, such that the gravity sensor, usually an acceleration sensor, may for example have its measuring direction along a longitudinal axis of the door. Regarding the locking arrangement, a fixing sensor may be provided, as in principle known, to detect the locking state of the locking arrangement. It is noted that it is also conceivable to implement such a detection device purely using mechanical means or a mechanical device, reducing the complexity of the safety arrangement. The detection device is optional. Alternatively, a manual locking mechanism could be used.

Advantageously, the door may be configured only to be opened towards the inside of the generator shaft. That is, a design may be chosen, in which, for safety reasons, the door can only be opened inwards to the generator shaft.

In this respect, it is also advantageous if the door is spring-loaded towards a closed position of the door. Using such a spring-loading mechanism, the door will close by itself when a person has passed. Additionally, unnecessary movement of the door during normal operation of the wind turbine, in particular when the safety element rotates with the hub and the generator shaft, may be prevented by such a spring-loading mechanism. It is noted that, of course, an additional fixing means or the like may be provided to additionally hold the door in a closed position, for example a magnetic fixing means or a magnet attachment.

The safety arrangement may further comprise a climbing means or climbing aid, in particular a ladder, wherein the climbing means and/or the safety element comprise suspension means or a suspension such that the climbing means may be removably suspended into the hub from the threshold of the door. That is, when the access door provided by the safety element is in the right position, that is, the entering position, a separate ladder or other climbing means may be attached to the rotatable safety element, in particular to its frame, such that the service technician can safely climb into the hub. Such a climbing means, in particular a ladder, may, for example, be stored in the nacelle and be brought along by the service technician. The ladder can be a separate component from the frame or integrated with the frame as a fixed component.

Additionally, or alternatively, at least one climbing aid may be fixedly installed in the hub. Such climbing aids have, for example, been described in EP 2 837 821 A1 regarding a hub accessible from the outside, but may also be used to facilitate maintenance work inside a hub enterable from a hollow generator shaft as well as aiding the service technician in safely entering the hub from the generator shaft.

In certain embodiments, the design of the separate climbing means or ladders or steps, which may be suspendedly arranged at the opening, and the design of climbing aids fixedly installed in the hub may be matched to each other, wherein, in particular, the climbing means may be dimensioned to meet a climbing aid of the hub in a corresponding maintenance position. Additionally, if, for example, in a wind turbine having three blades, one of the blades points vertically upward, the dimensions of the climbing means, in particular the ladder, may also correspond to the distance to the interior hub wall between the two blades pointing diagonally down.

In embodiments, the safety element may further comprise at least one hold at at least one side of the door, extending into the hub, to further aid climbing into the hub by the service technician and to further increase safety.

BRIEF DESCRIPTION

Some of the embodiments will be described in detail, with references to the following Figures, wherein like designations denote like members, wherein.

DETAILED DESCRIPTION

Figure 1:
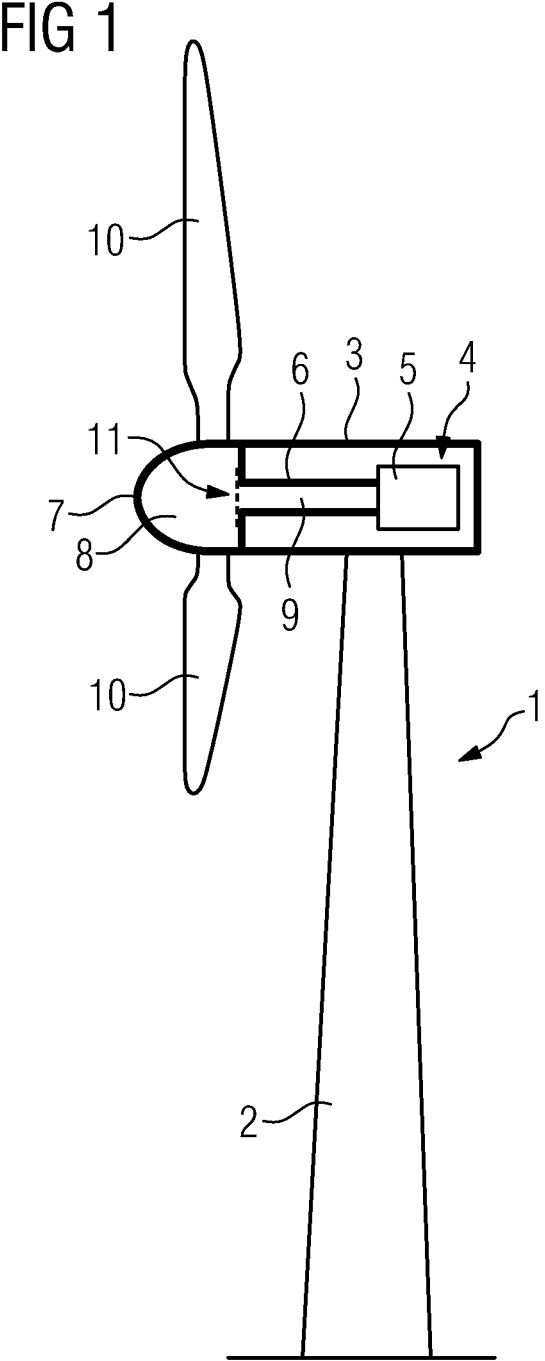
FIG. 1 shows a wind turbine according to embodiments of the current invention.

FIG. 1 shows a principle drawing of a wind turbine 1 according to embodiments of the current invention. The wind turbine 1 comprises a tower 2 carrying a nacelle 3, in which a generator arrangement 4 comprising a generator 5 is housed. A hollow generator shaft 6, often also called main shaft, is connected to a rotor hub 7. The rotor hub 7 is also hollow such that its interior 8 can be accessed from the interior 9 of the hollow generator shaft 6. In this case, three blades 10 are attached to the hub 7, from which, in FIG. 2, only two are visible due to perspective.

To provide increased safety for a service technician who wants to enter the hub 7 from the generator shaft 6, a safety arrangement generally indicated at 11 is provided, which is now described in more detail regarding the FIGS. 2 to 5.

Figure 2:
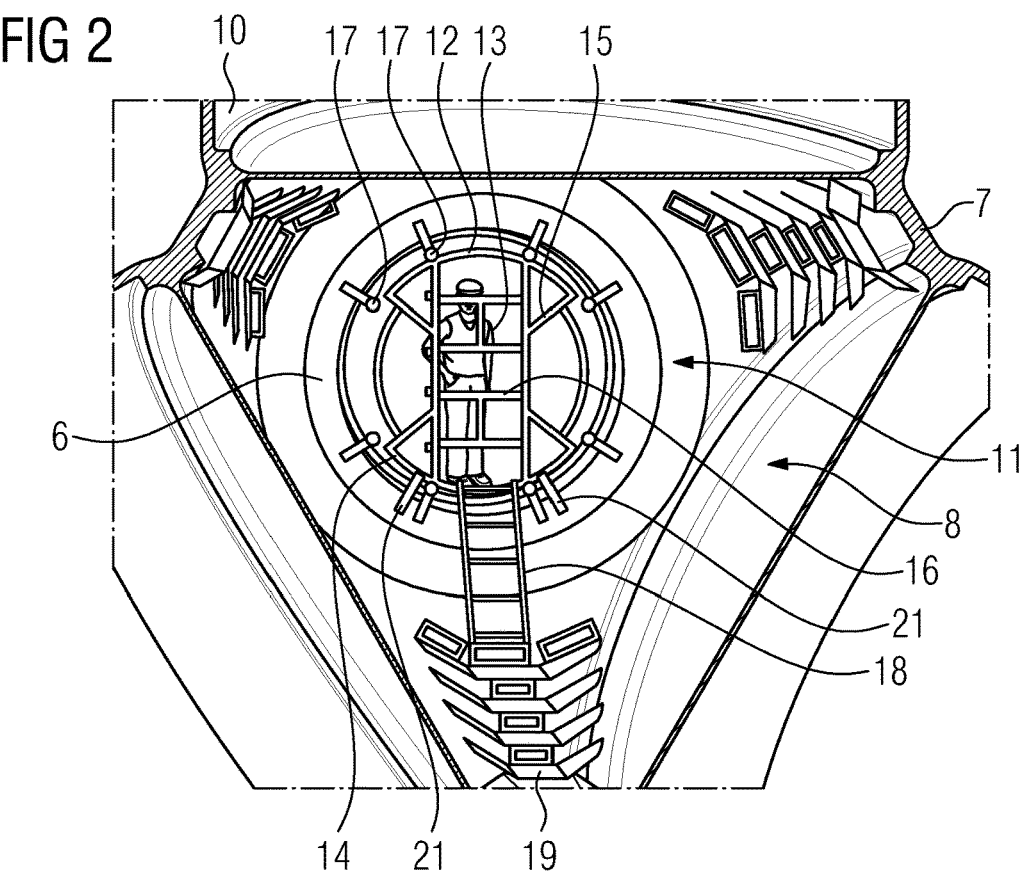
FIG. 2 is a view into the interior of the hub in a first position of the blades.

FIG. 2 shows a view into the interior 8 of the hub 7 in a first maintenance position, wherein a certain one of the blades 10 is in a vertical, upwards pointing orientation. The safety arrangement 11 comprises a safety element 12 covering the opening from the generator shaft 6 to the interior 8 of the hub 7, such that a service technician 13 cannot unintentionally fall in. The safety element 12 comprises an outer, circular frame 14 made of metal, in particular aluminium or an aluminium alloy or thin sheet metal, which is part of a fence-like structure 15 made of the metal. The safety element 12 further comprises a door 16 in the fence-like structure 15.

The safety element 12 is rotationally supported on the generator shaft 6 by rollers 17.

A climbing means or a climbing aid 18, in this case a ladder, is separately provided and may be suspended from the frame 14 or another part of the fence-like structure 15 using corresponding suspension means or suspender before the door 16 is opened. Alternatively, the ladder could be integrated with the frame 14 as a fixed component.

As can be seen, the hub 7 comprises additional climbing aids 19 and the climbing means or ladder or steps 18 is dimensioned to directly adjoin the climbing aid 19 when suspended from the frame 14 in the shown maintenance position.

Figure 3:
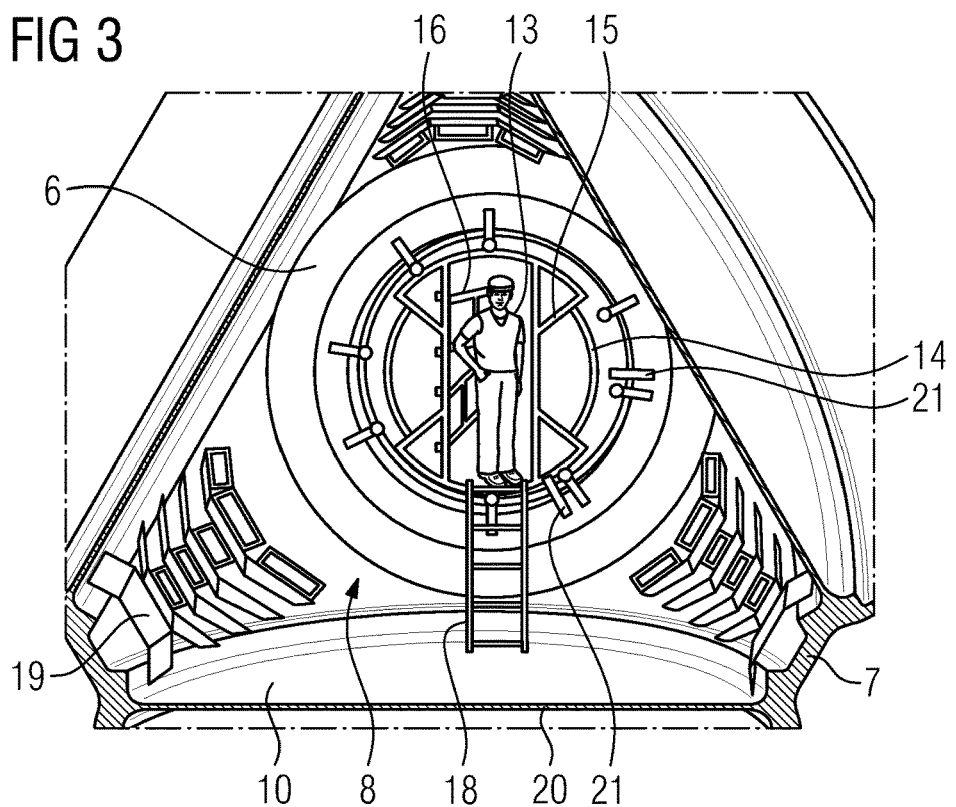
FIG. 3 is a view into the hub in a second position of the blades.

FIG. 3 shows another maintenance position in which a certain blade points vertically downwards. In this case, the climbing means 18 ends on top of the interior wall 20 of the hub 7 corresponding to the certain blade 10.

The safety arrangement 11 further comprises a locking arrangement 21 to fix the rotatably supported safety element 12 in a certain, predefined entering position in which the door 16 is vertically oriented. Further, during normal operation of the wind turbine 1, the safety element 12 is also fixed to the hub 7 and the generator shaft 6 such that it rotates with them. If maintenance is required, once a certain maintenance position is achieved, for example one of the maintenance positions shown in FIG. 2 or FIG. 3, the service technician 13 approaches the safety arrangement 11 from inside the hollow generator shaft 6. If the safety element 12, in particular the door 16, is not oriented in the entering position, they may unlock the locking arrangement 21 and rotate the rotatably supported safety element 12 into the entering position, where it can be fixed again using the locking arrangement 21. The service technician 13 can now suspend the climbing means 18 into the interior 8 of the hub 7 and open the door 16 to enter, as shown in FIG. 3. As can be seen, the door 16 is configured to only open towards the interior 9 of the generator shaft 6. The service technician 13 can now safely climb into the interior 8 of the hub 7.

Figure 4:
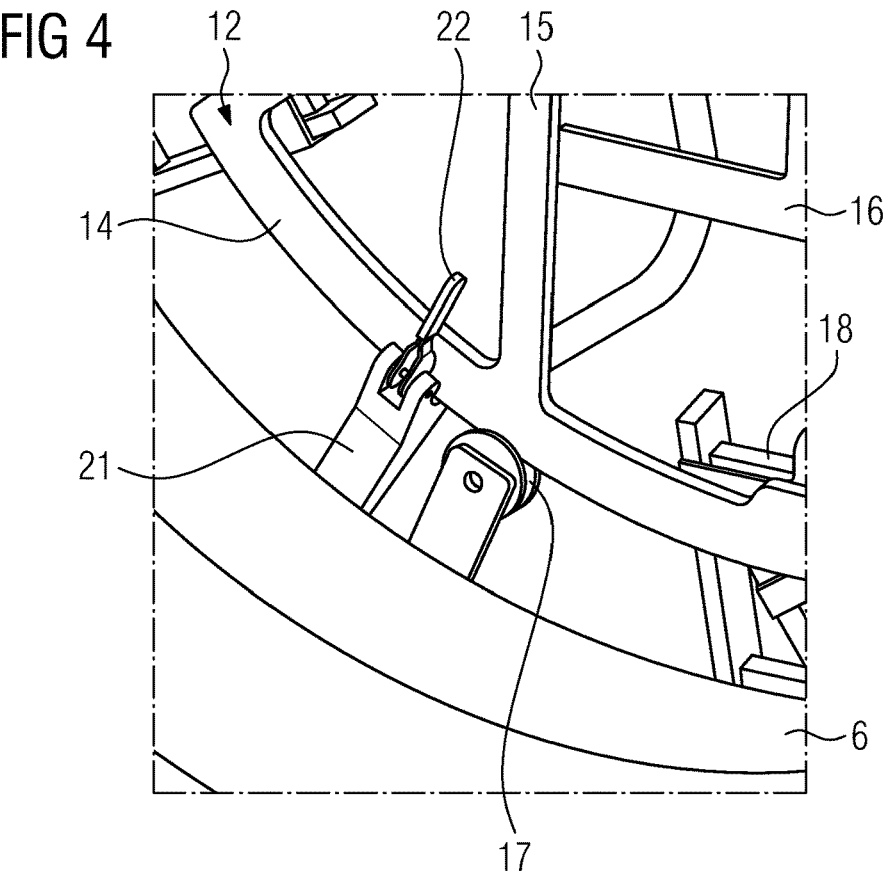
FIG. 4 is a close-up of a portion of a safety arrangement.

As can be seen from FIG. 4, the locking arrangement 21 comprises locking lever 22 using the excenter principle to fix the rotational position of the safety element 12. As can also be seen from FIG. 4, the rollers 17 comprise indentations in which the frame 14 or outer part of the fence-like structure 15 is guided.

The frame 14 is integral with the fence-like structure 15, as can also be seen in FIG. 2 and FIG. 3.

Figure 5:
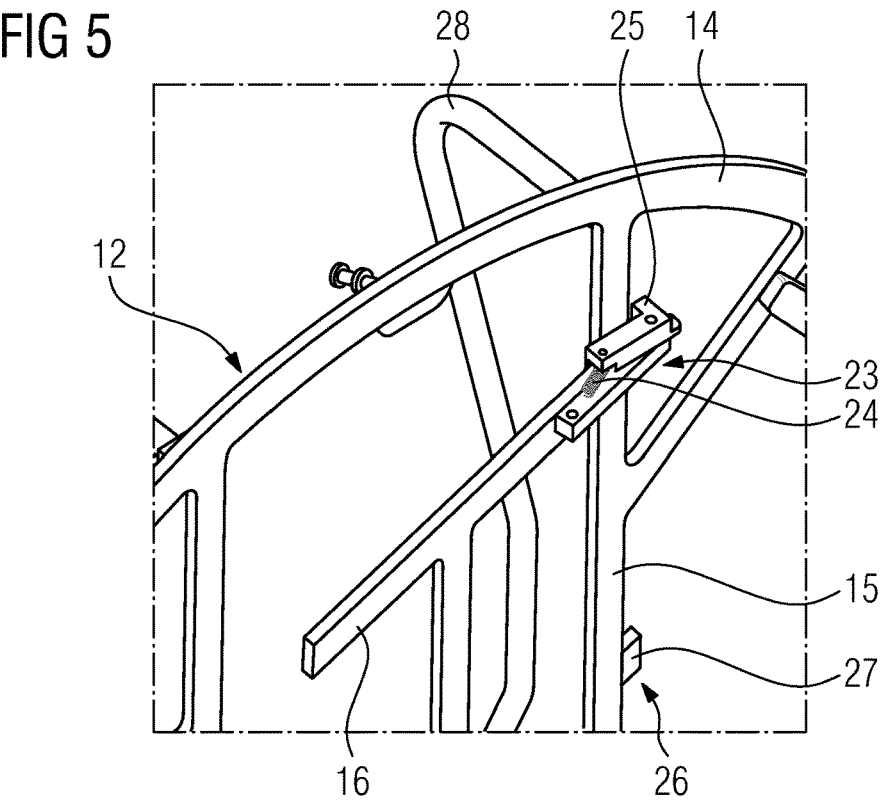
FIG. 5 shows a closer view of the safety arrangement in a door area.

FIG. 5 illustrates that the door 16 is coupled to the fence-like structure 15 by a spring-loading mechanism 23 using a spring 24 such that the door 16 automatically closes and is kept in a closed position by the corresponding restoring force of the spring 24.

Optionally, the safety element 12 may also comprise a lock 25 which is controlled by a detection device 26 such that the door 16 only opens when the safety element 12 is in the entering position. In this example, the detection device 26 may comprise a gravity sensor 27 (acceleration sensor) to detect a predefined orientation of the safety element 12 corresponding to the entering position. In other embodiments, the detection device 26 may further comprise a fixing sensor for detecting the locking state of the locking arrangement 21; in this case, the lock 25 only opens if the safety element 12 is in the entering position and fixed in its rotational position by the locking means or locking device 21. It would also be possible to not use a lock 25 or to use other means for locking and unlocking the lock 25 then the discussed detection device 26, e.g. a manual lock.

It is noted that the safety element 12 may also comprise handles or holds 28 at at least one side of the door 16, further simplifying climbing into or out of the hub 7.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine having a hollow, walkable generator shaft of a generator assembly and a hollow hub attached to the generator shaft and having at least two blades attached to it, wherein the hub is enterable from the generator shaft and the wind turbine is stoppable in at least two predetermined maintenance positions of the blades, wherein the wind turbine further comprises a safety arrangement, in which a rotatably supported safety element having a door is mounted covering the opening leading from the generator shaft into the hub, wherein a locking arrangement for fixing the safety element in an entering position, in which the door is vertically oriented, is provided.

2. The wind turbine according to claim 1, wherein the safety element comprises a fence-like structure, wherein the fence-like structure is a metal structure, in which the door is provided.

3. The wind turbine according to claim 1, wherein the safety element is rotatably supported using rollers mounted to at least one of the generator shaft and the hub.

4. The wind turbine according to claim 1, wherein the locking arrangement comprises a locking lever, wherein the locking lever engages an outer frame of the fence-like structure.

5. The wind turbine according to claim 1, wherein the door comprises a lock controlled by a detection device such that the door only opens when the safety element is in at least one of the entering position and fixed by the locking arrangement.

6. The wind turbine according to claim 5, wherein the detection device comprises a gravity sensor for detecting a predefined orientation of the safety element corresponding to at least one of the entering position, and a fixing sensor for detecting the locking state of the locking arrangement.

7. The wind turbine according to claim 1, wherein the door is configured only to be opened towards the inside of the generator shaft.

8. The wind turbine according to claim 1, wherein the door is spring-loaded towards a closed position of the door.

9. The wind turbine according to claim 1, wherein the safety arrangement further comprises a climbing aid wherein the climbing aid and/or the safety element comprise a suspension such that the climbing aid may be removably suspended into the hub from the threshold of the door.

10. The wind turbine according to claim 1, wherein at least one climbing aid is fixedly installed in the hub.

* * * * *